United States Patent Office 3,087,502
Patented Apr. 30, 1963

3,087,502
END WRAP IMPREGNATED WITH HYDROLYZED POLYACRYLIC RESINS
Philip F. Rosmarin, 328 E. 65th St., New York 21, N.Y.
No Drawing. Filed May 5, 1960, Ser. No. 26,982
10 Claims. (Cl. 132—43)

This invention relates to a hair curling end wrap for setting or curling and lusterizing human hair with a uniform protective, non-hygroscopic, non-oily or non-greasy, non-tacky, and substantially non-flaking film of a polymer of the acrylic acid series which contains carboxyl groups, and of which the alkali and amine salts are soluble in water and also in a water-soluble aliphatic alcohol of low molecular weight or in a mixture of such alcohols, and which is made by polymerizing in solution in a water-soluble aliphatic alcohol of low molecular weight or in a mixture of such alcohols, and, if preferred, jointly with another copolymerizable compound, and subsequently hydrolyzing a proportion of the ester groups sufficient to render a salt of the polymer soluble in water, and also to the method of making said end wrap.

Such polymers here utilized are also referred to in the hair fixative art as hydrolyzed polyacrylic resins and also as salts of hydrolyzed polyacrylate esters, and their methods of manufacture are fully disclosed in U.S. Patent No. 2,897,172, of which British Patent Nos. 796,318 and 796,319 are counterparts. More specifically, they are alkali metal or amine salts of acrylic acid ester polymers containing carboxyl groups or of copolymers containing carboxyl groups of acrylic acid esters with other ethylenically unsaturated compounds, and said salts are soluble both in water and in a water-soluble aliphatic alcohol of low molecular weight, such as methyl alcohol, ethyl alcohol, propyl alcohol, isopropyl alcohol, or mixtures of at least two of these alcohols. The process for forming these compounds comprises polymerizing an acrylic acid ester of an aliphatic alcohol having at most six carbon atoms, and preferably one to four carbon atoms, alone or together with another ethylenically unsaturated polymerizable compound in a water-soluble aliphatic alcohol of low molecular weight, preferably an alcohol having one to four carbon atoms, subsequently hydrolyzing in said resulting alcohol solution of the polymer or copolymer a sufficient proportion of the ester groups with an alcohol solution of an alkali metal hydroxide thereby to render the alkali metal salt of the polymer or copolymer soluble in water as well as in a water-soluble aliphatic alcohol of low molecular weight, and, if desired, converting the alkali metal salts into an amine salt.

As heretofore set forth, the acrylic acid ester is preferably one derived from an aliphatic alcohol containing at most six carbon atoms, preferably one containing one to four carbon atoms, and includes methyl acrylate, propyl acrylate, isopropyl acrylate, secondary-butyl acrylate, tertiary-butyl acrylate, isobutyl acrylate, and more particularly ethyl acrylate, and the ester may at least be partially esterified with an aliphatic alcohol such as hexyl alcohol. Also, to produce polymers of varying softnesses, the acrylic acid ester is copolymerized with an ethylenically unsaturated polymerizable compound such as a methacrylic acid ester of an aliphatic alcohol having at most six carbon atoms, and preferably from one to four carbon atoms, an acrylic acid ester of an alcohol having at most six carbon atoms, acrylonitrile, acrylic acid amide, a substituted acrylic acid amide, a vinyl alkyl ketone, and a vinyl-aryl compound.

In the polymerization or copolymerization processes, the water-soluble aliphatic alcohols of low molecular weight, which preferably contain one to four carbon atoms, in which the polymerization or copolymerization is carried out, include methyl alcohol, propyl alcohol, isopropyl alcohol, and ethyl alcohol, or mixtures of at least two of said alcohols. The polymerization or copolymerization is preferably carried out at a raised temperature, preferably at the boiling temperature of the solvent, and with the addition of a peroxide catalyst such as benzoyl peroxide, acetyl peroxide, acetyl-benzoyl peroxide, cumene hydroperoxide or tertiary-butyl hydroperoxide, which is likewise soluble in the reaction medium.

The partial hydrolysis of the ester groups may be carried out by the usual methods, and the alcohol solutions of the polymers or copolymers resulting from the polymerization or copolymerization are subjected directly to the hydrolysis with an alkali metal hydroxide, such as lithium hydroxide or sodium hydroxide or potassium hydroxide, dissolved in an alcohol, preferably an ethyl alcohol or an isopropyl alcohol solution of the alkali metal hydroxide. The proportion of the hydrolyzing agent utilized, in order that the final product shall be soluble both in water and in a water-soluble aliphatic alcohol of low molecular weight, depends on the nature of the ester used and of any other polymerizable component that may be present and can easily be determined by a preliminary test. The alcohol solutions of the alkali metal salts resulting from the hydrolysis may be evaporated to dryness, if desired under reduced pressure, or may be spray dried.

The conversion of the aforedescribed alkali metal salts of the polymers or copolymers containing carboxyl groups into the corresponding triethanolamine salts is accomplished by precipitating with an acid, such as aqueous hydrochloric acid, the polycarboxylic acid from an aqueous alcoholic solution of the alkali metal salt, separating the precipitate by filtration or centrifuging, and then neutralizing in water or alcohol by means of triethanolamine. The resulting triethanolamine salt solution is then evaporated to dryness, if desired under reduced pressure. It also may be of advantage to convert a part of the neutralized carboxyl groups into free carboxylic acid groups.

More specifically, this invention relates to a hair curling end wrap, and a method for making same, for setting or curling and lusterizing human hair with a uniform film, as heretofore described, of an alkali metal or amine salt of an acrylic acid ester polymer containing carboxyl groups or of a copolymer containing carboxyl groups of an acrylic acid ester with another ethylenically unsaturated polymerizable compound, the salts being soluble in both water and in a water-soluble aliphatic alcohol of low molecular weight.

Said salts of hydrolyzed polyacrylate esters and solutions thereof are fully disclosed in said U.S. Patent No. 2,897,172 and its aforestated British counterparts. The use of same as hair fixatives is also fully disclosed by application to the hair from a solution only. Said solutions so described include, in combinations, at least an alcohol and polyhalogenated hydrocarbons such as the "Freon" gases. Also included in said solutions are such compounds as polyglycolethers. Such alcohols, hydrocarbons, etc. do not have any beneficial effect to the human hair.

Heretofore said hydrolyzed polyacrylic resins, as hereinbefore described, were known to be applied to the human hair in no other fashion but from a solution, and then from a sprayable solution by means of a Freon propellant which was included in combination in said solution. Thus, in applying same to the hair, the hair is first set as in the form of curls and the so-set formed coiffure is sprayed with the fixative solution.

I have discovered that any one of the aforedescribed hydrolyzed polyacrylic resins can be very easily and uniformly and rapidly applied to the human hair while simultaneously imparting a curl or other desired shape to the human hair without utilizing therewith any carrier materials such as hydrocarbons, alcohols, or the like, which are known not to have any beneficial effect to the hair and scalp when used in relatively large quantities, and in the form of a uniform protective, lustrous, non-hygroscopic, non-oily or non-greasy, non-tacky, substantially non-flaking surface film. This is accomplished with a hair curling or setting end wrap comprising a porous fabric such as highly absorbent porous paper of substantially high purity cellulose paper having a high wet strength or cloth impregnated, by absorption and adsorption, each with an even, level, uniform application of any of the aforedescribed hydrolyzed polyacrylic resins. The fabric is sufficiently porous that it can be uniformly impregnated with any of the aforedescribed resins by absorption and adsorption utilizing a solution of the resin in any of the aforementioned water-soluble aliphatic alcohols having a low molecular weight. The porous fabric has a thickness preferably no greater than 0.020 inch and possesses sufficient flexibility to enable strands or a tuft or tress of hair when embraced by the impregnated end wrap to be rolled into the desired curl or shape. The porous fabric preferably has a wet strength sufficient to withstand a tension of 50 grams applied to a one-half inch wide strip. The impregnated porous fabric may be stored for an indefinite length of time without impairing its effective activity.

An object of my invention is to provide a hair curling or setting end wrap for easily curling or setting human hair while simultaneously applying to said hair a uniform protective, lustrous, non-hygroscopic, non-oily or non-greasy, non-tacky, substantially non-flaking, clear and transparent film of a hydrolyzed polyacrylic resin, said end wrap comprising a porous fabric uniformly impregnated with such a hydrolyzed polyacrylic resin.

Another object of my invention is to provide a method for forming said aforementioned end wraps.

Other objects of my invention will become readily apparent from the following description which merely illustrates my invention and does not limit my invention.

In using the end wrap of my invention, the hair is first thoroughly wetted with water and then combed into strands. An end wrap uniformly impregnated with a hydrolyzed polyacrylic resin of the type hereinbefore described hereinafter more particularly described is then folded around a wet strand or tress of hair as closely to the scalp as possible and then moved towards the end of the strand or tress to cover the end of the strand or tress, and, by means of a roller, the water-wetted strand or tress in the so-folded fabric is wound in the form of a curl, using the roller as the form, and held in position by fasteners such as hairpins or clips. The hydrolyzed polyacrylic resin being soluble in water is uniformly removed from the end wrap by the solvent action of the water onto the hair of the strand thereby forming a uniform protective as aforedescribed resin film. The hair is allowed to dry, and the fabric together with the roller and fasteners are removed leaving a uniformly shaped curl each hair of which is coated with a uniform protective, highly lustrous, non-hygroscopic, non-oily or non-greasy, non-tacky, substantially non-flaking, clear and transparent film of the hydrolyzed polyacrylic resin. Thusly the said film is formed without the hair contacting any hydrocarbon, alcohol, or any other material likely to have a deleterious effect thereupon.

The hair curling or setting end wrap of my invention is preferably formed by thoroughly dissolving a predetermined amount of the hydrolyzed polyacrylic resin in a predetermined amount of a water-soluble aliphatic, said respective amounts depending upon the type of fabric to be impregnated, alcohol of low molecular weight including methyl alcohol, ethyl alcohol, propyl alcohol, isopropyl alcohol, or a mixture of at least any two of said alcohols, substantially water free, thoroughly wetting the porous fabric, preferably the aforedescribed highly absorbent high wet-strength porous paper known as Goody curl tissue #129 which is the product of H. Goodman & Sons, Division of Delamere Co., Inc., of New York, New York, with said alcoholic solution, as by dipping or immersion, rolling on, etc., and thoroughly drying said so-wetted fabric to remove thoroughly therefrom the relatively quick drying alcohol solvent, thereby to obtain a substantially dry salt of the hydrolyzed polyacrylate ester or dry hydrolyzed polyacrylic resin uniformly impregnated, by absorption and adsorption, end wrap. As is quite readily apparent, the strength of the alcoholic solution with respect to the resin varies with the type of fabric used, and the greater the ability of the fabric used to absorb and adsorb the resin and still remain dry, the greater the concentration of the resin in the alcoholic solution. Likewise, the amount of resin in the end wrap will vary with the type of fabric used. Likewise, another consideration with respect to the strength of the alcoholic resin solution is of course governed by the alcoholic resin solution easiest to handle for impregnating the various fabrics. I have found most preferable with respect to the aforedescribed high wet strength paper having a thickness of 0.015 inch 2.5% resin, by weight, alcoholic solution, the alcohol being a water-soluble aliphatic alcohol of low molecular weight, preferably having one to four carbon atoms, as hereinbefore described. The end wrap of my invention is uniformly impregnated with the resin and is substantially dry and does not adhere to a similarly impregnated porous fabric when placed in contact therewith, as in the packaging of same for sale thereof. The so-impregnated porous fabric may be stored indefinitely until used. Further, to hasten the drying of the aforementioned thoroughly wetted fabric, the so-wetted fabric may be squeezed, as by passing between rollers, to remove excess solution prior to exposure to the drying atmosphere.

The following examples for forming the resins are set forth for the purpose of illustration only and are not considered to be limiting, and the parts are by weight unless otherwise specified.

*Example A*

The method for forming the resin or potassium salt disclosed in this example is completely disclosed in Example 1 of U.S. Patent No. 2,897,172 and is as follows:

"A mixture of 168 parts of ethyl acrylate and 490 parts of ethyl alcohol are heated under reflux. There are then added 1.5 parts of benzoyl peroxide suspended in a small quantity of alcohol, and the polymerization sets in immediately with the evolution of heat. While the polymerization is still in progress, a further 168 parts of ethyl acrylate are run in in the course of 80 minutes, while taking care that the temperature does not fall.

"When the addition is complete, the polymerization is continued for a further 5 hours, and two additions each of 0.7 part of benzoyl peroxide are added, one after 20 minutes and the other after 1½ hours. In this manner there is obtained a colorless thinly liquid polymer solution having a polymer content of about 40 percent. The relative flow time of the solution as measured at 20° C. in an Oswald viscometer is 73.5, the flow time for water being equal to 1.

"820 parts of the polymer solution described above are mixed with a solution of 55.5 parts of potassium hydroxide in 2480 parts of ethyl alcohol. For the purpose of hydrolysis the mixture is heated for 6 hours under reflux. At the end of this period the hydrolysis is finished. There is obtained an almost colorless polymer solution having a dry content of about 10 percent. Its relative viscosity at 20° C. is 2.70 (in relation to water=1)."

The so-obtained alcohol solution is then evaporated to a 50% solids content to form a solution of 50 parts of the salt in 50 parts of ethyl alcohol. This solution is hereafter referred to as Solution A.

Example B

The method for forming the resin or potassium salt disclosed in this example is completely disclosed in Example 2 of U.S. Patent No. 2,897,172 and is as follows:

"When 490 parts of isopropyl alcohol are used as solvent instead of ethyl alcohol for the polymerization of ethyl acrylate in the manner described in Example 1 (of U.S. Patent No. 2,897,172), operations are carried on in the same way until the addition of the monomer is complete, polymerization is then carried on for 7 hours. When the addition of the monomer is complete, two additions of 0.7 part of benzoyl peroxide suspended in about 3 parts of isopropanol are added, one after 2½ hours and the other after 5 hours.

"There is obtained a colorless, thinly liquid polymer solution having a polymer content of 40 percent.

"500 parts of this polymer solution are heated with a solution of 40 parts of potassium hydroxide of 84.4 percent strength (commercial potassium hydroxide) in 1470 parts of isopropanol for 6 hours under reflux. The desired hydrolysis is then finished. From the reaction product the solvent is distilled while stirring and under slightly reduced pressure until a resin content of 50 percent is obtained. In this manner about 1400 parts of solvent, chiefly isopropanol, are recovered. The resin solution of 50 percent strength is a viscous liquid which can be diluted to any degree with water or with ethyl alcohol. The relative viscosity of the solution of 10 percent in isopropanol at 20° C. (in relation to water=1) is 4.36."

The so-formed potassium salt, which is soluble both in water and in a water-soluble aliphatic alcohol of low molecular weight, as hereinbefore described, is then obtained by evaporating the alcohol solution to dryness, and the dry salt is then dissolved in absolute ethyl alcohol to form a solution of 50 parts of the salt in 50 parts of ethyl alcohol. This solution is hereinafter referred to as Solution B.

Example C

The method for forming the resin or potassium salt disclosed in this example is completely disclosed in Example 3 of U.S. Patent No. 2,897,172 and is as follows:

A mixture of 19 parts of ethyl acrylate, 1 part of styrene and 58 parts of isopropanol heated under reflux is polymerized by the gradual addition of 0.4 part of benzoyl peroxide suspended in 2 parts of isopropanol. When polymerization has set in, a mixture of 19 parts of ethyl acrylate and 1 part of styrene is run in in the course of 1½ hours and polymerization is carried on for 6½ hours altogether at 80–82° C. There are obtained 99.5 parts of a slightly viscous colorless solution of the copolymer having a resin content of 39.2 percent.

"51 parts of this resin solution are heated with a solution of 3.98 parts of potassium hydroxide of 84.4 percent strength in 146 parts of ethyl alcohol under reflux with stirring. At the end of 6 hours the desired partial hydrolysis is finished. The reaction product is a faintly yellow colored clear thin syrupy liquid having a resin content of 10.6 percent. The relative viscosity of the solution of exactly 10 percent in isopropanol at 20° C. is 3.70, in relation to water=1; $d_4^{20}=0.820$."

The so-formed potassium salt, which is soluble both in water and in a water-soluble aliphatic alcohol of low molecular weight, as hereinbefore described, is then obtained by evaporating the alcohol solution to dryness, and the dry salt is then dissolved in absolute ethyl alcohol to form a solution of 50 parts of the salt in 50 parts of ethyl alcohol. This solution is hereinafter referred to as Solution C.

Example D

The method for forming the resin or potassium salt disclosed in this example is completely disclosed in Example 4 of U.S. Patent No. 2,897,172 and is as follows:

"The same method is used as described in Example 3 (of U.S. Patent No. 2,897,172), but instead of 19 parts of ethyl acrylate only 18 parts are used, and instead of 1 part of styrene, 2 parts of methyl methacrylate. When copolymerization has set in, a mixture of 18 parts of ethyl acrylate and 2 parts of methyl methacrylate is added in the course of 1½ hours and polymerization is carried on for 6½ hours altogether at 80–82° C.

"The reaction product is a clear, colorless liquid of low viscosity having a dry resin content of 40.0 percent.

"For the purpose of partial hydrolysis 50 parts of this resin solution are mixed with a solution of 3.98 parts of potassium hydroxide of 84.4 percent strength in 146 parts of isopropanol and heated under reflux for 6 hours with stirring. There is obtained a nearly colorless, clear, slightly syrupy liquid having a dry content of 11.1 percent and a relative viscosity of 20° of 4.95 in relation to water=1; $d_4^{20}=0.825$."

The so-formed potassium salt, which is soluble in both water and in a water-soluble aliphatic alcohol of low molecular weight, as hereinbefore described, is then obtained by evaporating the alcohol solution to dryness, and the dry potassium salt is then dissolved in absolute ethyl alcohol to form a solution of 50 parts of the salt in 50 parts of ethyl alcohol. This solution is hereinafter referred to as Solution D.

Example E

The method for forming the resin or lithium salt disclosed in this example is completely disclosed in Example 5 of U.S. Patent No. 2,897,172 and is as follows:

"50 parts of the polymer solution of 40 percent strength described in the first paragraph of Example 2 (of U.S. Patent No. 2,897,172), are heated under reflux for 21 hours at 79–80° C. with a solution of 2.53 parts of lithium hydroxide hydrate (LiOH·H$_2$O) in 146 parts of isopropanol. As reaction product there is obtained a solution of 10.7 percent strength of the lithium salt of a partially hydrolyzed polyethyl acrylate. It is a clear, colorless liquid which on a glass plate dries to a very adhesive colorless, lustrous film."

The so-formed lithium salt, which is soluble in both water and in a water-soluble aliphatic alcohol of low molecular weight, as hereinbefore described, is then obtained by evaporating the alcohol solution to dryness, and the dry lithium salt is then dissolved in absolute ethyl alcohol to form a solution of 50 parts of the salt in 50 parts of ethyl alcohol. This solution is hereinafter referred to as Solution E.

Example F

The method for forming the resin or triethanolamine salt disclosed in this example is completely disclosed in Example 6 of U.S. Patent No. 2,897,172 and is as follows:

"121 parts of the alcoholic polyethyl acrylate solution of 40 percent strength described in the first paragraph of Example 1 (of U.S. Patent No. 2,897,172) are mixed with a solution of 5.94 parts of sodium hydroxide of 96.9 percent strength in 350 parts of ethyl alcohol, and the mixture is heated for 6 hours under reflux with stirring. There is obtained a suspension of the sodium salt of a polyethylacrylate hydrolyzed to 30 percent. 16.1 parts of aqueous hydrochloric acid of 32.5 percent strength are added at room temperature and 200 parts by volume of ether, and the whole is cooled to 10° C. After letting it stand for a short time it is filtered off from the precipitated sodium chloride, and the solvent is distilled off completely. As residue there are obtained 43 parts of a colorless elastic somewhat sticky resin which still contains about 1 percent of solid sodium chloride. The resin is dissolved again in about 110 parts of absolute ethyl alcohol with heating on a water bath, the remaining small quantity of sodium chloride precipitating. When cool, the whole is filtered. The clear filtrate contains the free polyethyl acrylate containing carboxyl groups and has a resin content of 28 percent.

"For the purpose of conversion into the triethanolamine salt there are added to 71.5 parts of this filtrate 9.88 parts of triethanolamine (of 98.6 percent strength) with stirring and heating to 40° C. and finally diluting the whole with 216.2 parts of absolute ethyl alcohol. There are obtained 297.5 parts of a clear yellow colored solution of the triethanolamine salt of the polyethyl acrylate containing carboxyl groups. The solution has a dry content of 10 percent."

The so-obtained alcohol solution is then evaporated to a 50% solids content, and this solution of 50 parts of the salt in 50 parts of ethyl alcohol is hereinafter referred to as Solution F.

The following examples for preparing the hair curling or setting end wrap of my invention are set forth for the purpose of illustration only and are not considered to be limiting.

*Example 1*

A solution is made up by adding 5 grams of Solution A to 95 grams of substantially water-free isopropyl alcohol, and there is thusly formed a 2½% of the aforedescribed salt or resin, by weight, substantially water-free mixed alcohol solution. A sheet 9" x 8½" of high wet-strength porous paper, as heretofore described and known as Goody curl tissue #129, having a thickness of 0.015 inch is immersed in said solution and thoroughly wetted with said solution. The so-wetted paper is then dried, and the so-dried paper uniformly impregnated with the resin or salt as described in Example A is not distinguishable by the naked eye from untreated paper and is dry to the touch. The impregnated sheet is cut into twelve 3" x 2" sheets and used to curl or set the hair on the human head in the manner hereinbefore described. The hair is first wetted thoroughly with water and then combed into strands or tresses, twelve in number, to accommodate each 3" x 2" resin impregnated sheet. Each end wrap is folded around a wet combed out strand or tress of hair as closely to the scalp as possible and then moved towards the end of the strand or tress to cover the strand or tress end and, by means of a roller, the water-wetted strand or tress in the so-folded fabric is wound in the form of a rolled curl, using the roller as the form, and held in position by clips. The resin is thusly uniformly removed from the end wrap by the solvent action of the water onto the hair of the strand. The hair is allowed to dry, and then the papers together with the rollers and clips are removed leaving twelve uniformly shaped curls each hair of which is uniformly coated with a practically colorless, clear, transparent, protective, lustrous, non-hygroscopic, non-oily or non-greasy, non-tacky, non-flaking surface film.

*Example 2*

A solution is made up by adding 5 grams of Solution B to 95 grams of substantially water-free isopropyl alcohol, and there is formed a 2½% of the aforedescribed salt or resin, by weight, substantially water-free mixed alcohol solution. Likewise, as in Example 1 of this application, twelve 3" x 2" end wraps are formed, each uniformly impregnated with the resin or salt as described in Example B, and each is applied to human hair to form twelve uniformly shaped curls each hair of which is uniformly coated with a practically colorless, clear, transparent, protective, lustrous, non-hygroscopic, non-oily or non-greasy, non-tacky, non-flaking surface film.

*Example 3*

A solution is made up by adding 5 grams of Solution C to 95 grams of substantially water-free isopropyl alcohol, and there is formed a 2½% of the aforedescribed salt or resin, by weight, substantially water-free mixed alcohol solution. Likewise, as in Examples 1 and 2 of this application, twelve 3" x 2" end wraps are formed, each uniformly impregnated with the resin or salt as described in Example C, and each is applied to human hair to form twelve uniformly shaped curls each hair of which is uniformly coated with a practically colorless, clear, transparent, protective, lustrous, non-hygroscopic, non-oily or non-greasy, non-tacky, non-flaking surface film.

*Example 4*

A solution is made up by adding 5 grams of Solution D to 95 grams of substantially water-free isopropyl alcohol, and there is formed a 2½% of the aforedescribed salt or resin, by weight, substantially water-free mixed alcohol solution. Likewise, as in Examples 1, 2 and 3 of this application, twelve 3" x 2" end wraps are formed, each uniformly impregnated with the resin or salt as described in Example D, and each is applied to human hair to form twelve uniformly shaped curls each hair of which is uniformly coated with a practically colorless, clear, transparent, protective, lustrous, non-hygroscopic, non-oily or non-greasy, non-tacky, non-flaking surface film.

*Example 5*

A solution is made up by adding 5 grams of Solution E to 95 grams of substantially water-free isopropyl alcohol, and there is formed a 2½% of the aforedescribed salt or resin, by weight, substantially water-free mixed alcohol solution. Likewise, as in Examples 1, 2, 3 and 4 of this application, twelve 3" x 2" end wraps are formed, each uniformly impregnated with the resin or salt as described in Example E, and each is applied to human hair to form twelve uniformly shaped curls each hair of which is uniformly coated with a practically colorless, clear, transparent, protective lustrous, non-hygroscopic, non-oily or non-greasy, non-tacky, non-flaking surface film.

*Example 6*

A solution is made up by adding 5 grams of Solution F to 95 grams of substantially water-free isopropyl alcohol, and there is formed a 2½% of the aforedescribed salt or resin, by weight, substantially water-free mixed alcohol solution. Likewise, as in Examples 1, 2, 3, 4 and 5 of this application, twelve 3" x 2" end wraps are formed, each uniformly impregnated with the resin or salt as described in Example F, and each is applied to human hair to form twelve uniformly shaped curls each hair of which is uniformly coated with a practically colorless, clear, transparent, protective, lustrous, non-hygroscopic, non-oily or non-greasy, non-tacky, non-flaking surface film.

In each of the foregoing Examples 1–6, inclusive, a like amount of water, viz. 95 grams, is substituted for the isopropyl alcohol, viz. 95 grams and added to the set forth alcoholic resin Solutions A, B, C, D, E and F to form 2½% resin, by weight of solution, mixed aqueous and alcohol solutions, and impregnated end wraps are formed following the impregnated procedures set forth in each of said examples. The so-formed impregnated end wraps resulting from impregnation with these aqueous-alcoholic solutions of the respective resin are not uniformly impregnated with the respective resin and do not have an even, level, and clear appearance as is obtained using an alcoholic solution. From such end wraps results non-uniform hair coatings.

As is clearly apparent, I have discovered an end wrap by means of which human hair can be easily and uniformly curled or set or styled and simultaneously uniformly coated especially with respect to the so-styled portions with a uniform practically colorless, clear, transparent, protective, lustrous, non-hydroscopic, non-oily or non-greasy, non-tacky, and substantially non-flaking surface film. Further, with my end wrap, there is obtained better penetration and more even coating particularly because of the fact that the so-impregnated end wrap is at all times in contact with the human hair and the said resin is applied to the hair by formation of the aqueous solution in situ and not by spraying same from a position away from the hair. The bubble formation obtained when using sprayable solutions of said resins with the accompanying matte finish are obviated by the use of my so-impregnated end wrap which imparts a smooth level film. Further, the utilization of my so-impregnated end wrap results in a uniform film which is lustrous and has a well-groomed, just sufficiently glossy, appearance, but does not have an artificial glossy appearance so commonly attained with resins applied from solutions to the human hair.

Many changes and alterations may be made without departing from the spirit and scope of this invention which is set forth in the appended claims which are to be construed as broadly as possible in view of the prior art.

I claim:

1. A substantially dry hair curling end wrap for setting and lusterizing human hair comprising a porous fabric impregnated with a polymer of the acrylic acid ester series which contains carboxyl groups and carboxyl groups esterified with an aliphatic alcohol having at most six carbon atoms, and of which the alkali and triethanolamine salts are soluble in water and in a water-soluble aliphatic alcohol of low molecular weight, which polymer is produced by polymerizing at least one ester of an acrylic acid with an aliphatic alcohol having at most six carbon atoms in solution in a water-soluble aliphatic alcohol of low molecular weight, and hydrolyzing subsequently in the resulting polymer solution a sufficient proportion of the ester groups to render the alkali and triethanolamine salts of the polymer soluble in water.

2. A substantially dry hair curling end wrap for setting and lusterizing human hair comprising a porous fabric impregnated with a polymer of the acrylic acid ester series which contains carboxyl groups and carboxyl groups esterified with an aliphatic alcohol containing one to four carbon atoms, and of which the alkali and triethanolamine salts are soluble in water and in a water-soluble aliphatic alcohol of low molecular weight, which polymer is produced by polymerizing at least one ester of an acrylic acid with an aliphatic alcohol containing 1–4 carbon atoms in solution in a water-soluble aliphatic alcohol of low molecular weight, and hydrolyzing subsequently in the polymer solution a sufficient proportion of the ester groups to render the alkali and triethanolamine salts of the polymer soluble in water.

3. A substantially dry hair curling end wrap for setting and lusterizing human hair comprising a porous fabric impregnated with a polymer of the acrylic acid ester series which contains carboxyl groups and carboxyl groups esterified with an aliphatic alcohol having at most six carbon atoms and further copolymerized a minor amount of an ethylenically unsaturated compound selected from the group consisitng of (1) a methacrylic acid ester of an aliphatic alcohol having at most six carbon atoms, (2) an acrylic acid ester of an aliphatic alcohol having at most six carbon atoms, (3) acrylonitrile, (4) acrylic acid amide, (5) a substituted acrylic acid amide, (6) a vinyl alkyl ketone, and (7) a vinyl-aryl compound, and of which copolymer the alkali and triethanolamine salts are soluble in water and in a water-soluble aliphatic alcohol of low molecular weight, which polymer is produced by polymerizing an ester of an acrylic acid with an aliphatic alcohol having at most six carbon atoms together with a minor amount of said ethylenically unsaturated compound in solution in a water-soluble aliphatic alcohol of low molecular weight and hydrolyzing subsequently in the resulting polymer solution a sufficient proportion of the ester groups to render the alkali and triethanolamine salts of the polymer soluble in water.

4. A substantially dry hair curling end wrap for setting and lusterizing human haid comprising a porous fabric impregnated with a polymer of the acrylic acid ester series which contains carboxyl groups and carboxyl groups esterified with an aliphatic alcohol containing 1–4 carbon atoms and further copolymerized a minor amount of an ethylenically unsaturated compound selected from the group consisting of (1) a methacrylic acid ester of an aliphatic alcohol having at most six carbon atoms, (2) an acrylic acid ester of an aliphatic alcohol having at most six carbon atoms, (3) acrylonitrile, (4) acrylic acid amide, (5) a substituted acrylic acid amide, (6) a vinyl alkyl ketone, and (7) a vinyl-aryl compound, and of which copolymer the alkali and triethanolamine salts are soluble in water and in a water-soluble aliphatic alcohol of low molecular weight, which polymer is produced by polymerizing an ester of an acrylic acid with an aliphatic alcohol containing 1–4 carbon atoms together with a minor amount of said ethylenically unsaturated compound in solution in a water-soluble aliphatic alcohol of low molecular weight and hydrolyzing subsequently in the resulting polymer solution a sufficient proportion of the ester groups to render the alkali and triethanolamine salts of the polymer soluble in water.

5. A substantially dry hair curling end wrap for setting and lusterizing human hair comprising a porous fabric impregnated with a polymer of the acrylic acid ester series which contains carboxyl groups, and also ester groups derived from ethyl alcohol, and further copolymerized a minor amount of styrene, and of which the alkali and triethanolamine salts are soluble in water and in a water-soluble aliphatic alcohol of low molecular weight, which polymer is produced by polymerizing ethyl acrylate together with a minor amount of styrene in solution in ethyl alcohol and hydrolyzing subsequently in the resulting polymer solution a sufficient proportion of the ester groups to render the alkali and triethanolamine salts of the polymer soluble in water.

6. A substantially dry hair curling end wrap for setting and lusterizing human hair comprising a porous fabric impregnated with a polymer of acrylic acid ethyl ester which contains carboxyl groups and of which polymer the alkali and triethanolamine salts are soluble in water and in a water-soluble aliphatic alcohol of low molecular weight, which polymer is produced by polymerizing ethyl acrylate in solution in a water-soluble aliphatic alcohol of low molecular weight and hydrolyzing subsequently in the resulting polymer solution a sufficient proportion of the ester groups to render the alkali and triethanolamine salts of the polymer soluble in water.

7. A substantially dry hair curling end wrap for setting and lusterizing human hair comprising a porous fabric impregnated with a polymer of acrylic acid ethyl ester containing carboxyl groups neutralized with a member selected from the group consisting of alkali and triethanolamine, said polymer being soluble in water and in a water-soluble aliphatic alcohol of low molecular weight, which polymer is produced by polymerizing ethyl acrylate in solution in a water-soluble aliphatic alcohol of low molecular weight and hydrolyzing subsequently in the resulting polymer solution a sufficient proportion of the ester groups to render the alkali and triethanolamine salts of the polymer soluble in water.

8. A substantially dry hair curling end wrap for setting and lusterizing human hair comprising a porous fabric impregnated with a polymer of acrylic acid ethyl ester containing carboxyl groups neutralized with potassium, said polymer salt being soluble in water and in a water-soluble aliphatic alcohol of low molecular weight, which polymer is produced by polymerizing ethyl acrylate in solution in a water-soluble aliphatic alcohol of low molecular weight and hydrolyzing subsequently in the resulting polymer solution a sufficient proportion of the ester to render the alkali and triethanolamine salts of the polymer soluble in water by means of a solution of potassium hydroxide in solution of a water-soluble aliphatic alcohol of low molecular weight.

9. A substantially dry hair curling end wrap for setting and lusterizing human hair comprising a porous fabric impregnated with a polymer of the acrylic acid ester series containing carboxyl groups neutralized with a member selected from the group consisting of alkali and triethanolamine, and carboxyl groups esterified with an aliphatic alcohol having at most six carbon atoms, said polymer being soluble in water and being produced by polymerizing at least one ester of an acrylic acid with an aliphatic alcohol having at most six carbon atoms in solution in a water-soluble aliphatic alcohol at low molecular weight, and hydrolyzing subsequently in the resulting polymer solution a sufficient proportion of the ester groups to render the alkali and triethanolamine salts of the polymer soluble in water.

10. A substantially dry hair curling end wrap for setting and lusterizing human hair comprising a porous fabric impregnated with a polymer of acrylic acid ethyl ester containing carboxyl groups neutralized with potassium, said polymer salt being water-soluble and being produced by polymerizing ethyl acrylate in solution in isopropyl alcohol and hydrolyzing subsequently in the resulting polymer solution a sufficient proportion of the ester to render the alkali and triethanolamine salts of the polymer soluble in water by means of a solution of potassium hydroxide in solution of isopropyl alcohol.

References Cited in the file of this patent

UNITED STATES PATENTS

| | | |
|---|---|---|
| 2,832,357 | Powers | Apr. 29, 1958 |
| 2,839,066 | Sanders | June 17, 1958 |
| 2,869,559 | Moore | Jan. 20, 1959 |
| 2,897,172 | Maeder | July 28, 1959 |

FOREIGN PATENTS

| | | |
|---|---|---|
| 796,319 | Great Britain | June 11, 1958 |